United States Patent [19]

Kempter et al.

[11] Patent Number: 4,675,375

[45] Date of Patent: Jun. 23, 1987

[54] PREPARATION OF PHENOL RESOL ETHERS BONDED VIA O,O'-METHYLENE ETHER GROUPS

[75] Inventors: Fritz E. Kempter, Mannheim; Juergen Nieberle, Wachenheim, both of Fed. Rep. of Germany

[73] Assignee: BASF Aktiengesellschaft, Ludwigshafen, Fed. Rep. of Germany

[21] Appl. No.: 744,201

[22] Filed: Jun. 13, 1985

[30] Foreign Application Priority Data

Jun. 16, 1984 [DE] Fed. Rep. of Germany ....... 3422510

[51] Int. Cl.$^4$ .............................................. C08G 8/36
[52] U.S. Cl. ..................... 528/140; 525/480; 528/139; 528/142; 528/144; 528/129; 568/660
[58] Field of Search ............... 528/142, 139, 144, 140, 528/129; 568/660; 525/480

[56] References Cited

U.S. PATENT DOCUMENTS

| | | | |
|---|---|---|---|
| 3,485,797 | 12/1969 | Robins | 260/57 |
| 3,657,188 | 4/1972 | Perkins, Jr. | 528/140 |
| 4,045,411 | 8/1977 | Vasishth et al. | 528/140 X |
| 4,046,734 | 9/1977 | Zimmerli | 528/165 X |
| 4,120,847 | 10/1978 | Culbertson | 528/140 |
| 4,122,054 | 10/1978 | Culbertson | 260/29.3 |
| 4,157,324 | 6/1979 | Culbertson | 260/32.8 |
| 4,184,032 | 1/1980 | Vasishth | 528/139 |
| 4,235,989 | 11/1980 | Leong et al. | 528/139 |
| 4,448,951 | 5/1984 | Rupert et al. | 528/129 |
| 4,578,448 | 3/1986 | Brode et al. | 528/139 |

OTHER PUBLICATIONS

Whitehouse, Chemistry of Phenolic Resins, 1970, p. 107.

*Primary Examiner*—Howard E. Schain
*Attorney, Agent, or Firm*—Keil & Weinkauf

[57] ABSTRACT

Essentially phenol-free phenol resol ethers which are bonded via o,o'-methylene ether groups are prepared by a process in which A. where the process is carried out beginning with the methylolation in an aqueous medium, the methylolation is carried out in the presence of 0.5–10% by weight, based on the phenol employed, of Me$^{++}$ ions, the latter are then removed as a sparingly soluble salt, the water present as a solvent in the reaction mixture is removed at 30°–80° C. in the presence or absence of one or more monohydric, dihydric or trihydric alcohols and an entraining agent, and the water of reaction formed during the etherification is separated off at 45°–120° C., and B. where the process is carried out beginning with the methylolation in a non-polar organic solvent, the methylolation is carried out in the presence of 0.1–0.3% by weight, based on the phenol employed, of Me$^{++}$ ions, the etherification is effected at 95°–120° C. in the presence of one or more monohydric, dihydric or trihydric alcohols, with or without recycling of the distillate which passes over, and finally residual phenol in the products prepared by A. or B. is removed by evaporation in a thin film evaporator until the phenol content is less than 1% by weight.

The phenol resol ethers prepared according to the invention are useful for the preparation of coating systems and for adhesives.

7 Claims, No Drawings

PREPARATION OF PHENOL RESOL ETHERS BONDED VIA O,O'-METHYLENE ETHER GROUPS

The present invention relates to a process for the preparation of phenol resol ethers bonded via o,o'-methylene ether groups, and the preparation of coating systems and adhesives.

Ortho-rich resols are described in, for example, U.S. Pat. No. 3,485,797. The process in question is carried out in a non-aqueous solvent, e.g. benzene, etc.

Ortho-rich resols whose methylol groups have been partially etherified with monohydric alcohols are described in U.S. Pat. Nos. 4,120,847, 4,157,324 and 4,122,054.

The methylolation of the phenol for the preparation of ortho-rich phenol resols, i.e. those bonded via o,o'-methylene ether groups, is advantageously carried out in an aqueous medium. Introduction of the methylol groups into the o-position is preferably effected using divalent metal ions as catalysts. This reaction is most advantageously carried out at a pH of 4.5-5.5. In slightly alkaline solution, $Ca^{++}$ and $Mg^{++}$ ions can be used as catalysts. However, this pH results in an unfavorable degree of methylolation in the o-position.

Moreover, the amount of catalyst is one of the factors determining the degree of methylolation in the o-position and the yield, so that fairly large amounts of metal salts have to be used. These large amounts of metal salts lead to difficulties during the process and present problems with regard to the use of the products.

A disadvantage of the conventional ortho-rich resol ethers is their content of unreacted free phenol, which is in general 5-12%, based on the amount of solid resin.

It is an object of the present invention to provide a process for the preparation of ortho-rich phenol resol ethers, which ensures that, when the process is carried out beginning with methylolation in an aqueous medium, the relatively high concentrations of $Me^{++}$ ions required as a catalyst can be converted to essentially insoluble products, so that these products can be removed from the reaction mixture without, for example, filtration problems, and crosslinking reactions are avoided in the further course of the process.

It is a further object of the present invention to ensure that the products are essentially free of residual amounts of phenol, i.e. that their content of phenol is <1%.

Furthermore, the products should be such that they can advantageously be used for the intended applications, for example for the production of compression molding materials for electrical insulation, of laminates, especially those for electrical insulation, of fiber mats and of crosslinking agents which are suitable for coating systems and preferably produce little emission and, if appropriate, have a low methylol content, and for the preparation of coating agents.

We have found, surprisingly, that this object is achieved by the process according to the invention.

The present invention relates to a process for the preparation of essentially phenol-free phenol resol ethers, which are bonded via o,o'-methylene ether groups, from phenol and/or m-alkyl-substituted phenols, if desired as a mixture with other alkylphenols, and formaldehyde or a formaldehyde donor, in the presence of $Me^{++}$ ions and subsequent etherification with a monohydric, dihydric or trihydric alcohol, wherein A. where the process is carried out beginning with methylolation in an aqueous medium:
$a_1$ the methylolation is carried out in the presence of 0.5-10% by weight, based on the phenol used, of $Me^{++}$ ions,
$a_2$ the $Me^{++}$ ions are then removed as a sparingly soluble salt, and
$a_3$ the water present as a solvent in the reaction mixture is removed at 30°-80° C. in the presence or absence of one or more monohydric, dihydric or trihydric alcohols and an entraining agent, and the water of reaction formed during the etherification is separated off at 45°-120° C.;

B. where the process is carried out beginning with methylolation in a nonpolar organic solvent:
$b_1$ the methylolation is carried out in the presence of 0.1-0.3% by weight, based on the phenol used, of $Me^{++}$ ions, and
$b_2$ the etherification is effected at 95°-120° C. in the presence of one or more monohydric, dihydric or trihydric alcohols, with or without recycling of the distillate which passes over;

and finally, the residual amounts of phenol in the products prepared according to A. or B. are removed by evaporation in a thin film evaporator until the phenol content is less than 1% by weight.

The etherification is preferably carried out using monohydric or dihydric alcohols, in particular hexanediol.

The $Me^{++}$ ions are preferably employed in the form of carboxylates, the formates, acetates or propionates being preferred carboxylates when the process is carried out according to A, and the naphthenates, octoates and neodecanoates of divalent metals being preferred carboxylates when the process is carried out according to B.

The present invention furthermore relates to the use of the phenol resol ethers obtained according to the invention for the production of coating systems and adhesives.

Where the process is carried out in an aqueous medium, the sequence of steps to be effected corresponds to the above sequence of $a_1$ to $a_3$. Any change in this sequence, for example separating off the water before removing the salts, would influence the filterability and hence make the process technically much more difficult to carry out.

Regarding the components and the individual process steps, and the use of the products, the following may be stated specifically:

A. Where the process is carried out in an aqueous medium:

$a_1$ To prepare the ortho-rich resol ethers by the process according to the invention, phenol, if desired as a mixture with alkylphenols (o- or p-substituted) or hydrocarbon resins containing phenol groups, or phenolic substances modified with polybutadiene oils, for example as described in European Pat. No.2,517, and m-substituted alkylphenols are reacted with formaldehyde in an aqueous system in the presence of catalysts, e.g. divalent metal ions, which direct the reaction to the o-position, at pH 4-7, preferably 4.5-6.0, and at 80°-100° C., until a predominant amount of the formaldehyde has been converted. Suitable catalysts are the salts of volatile organic carboxylic acids with divalent electropositive metals, e.g. $Zn^{++}$, $Sn^{++}$, $Mg^{++}$, $Ca^{++}$, $Pb^{++}$, $Ba^{++}$ or $Co^{++}$, or a mixture of these, in an amount of 0.5-10, preferably 1.3–5%, by weight, based on phenol used, preferably in the form of their carboxylates, such as their formates, acetates and propionates. Formates and acetates are particularly preferred. The molar ratio of phenol to formaldehyde employed is in general from 1:1.0 to 1:2.5, preferably from 1:1.5 to 1:2.2. The degree of condensation of the products toward the end of this stage of the process is on average 1–4 phenol units. Higher degrees of condensation generally result in inhomogeneous aqueous formulations.

$a_2$ Process stage $a_2$ relates to the removal of the dissolved amounts of catalyst, i.e. the $Me^{++}$ ions.

$a_{2.1}$ For this purpose, they can be converted to water-insoluble salts, e.g. phosphates (hydrogen phosphates or ammonium phosphates), sulfates or carbonates. The criterion used in making a choice is the ease of removal of the virtually insoluble salts, for example by filtration. Filtration is promoted if the alcohols used subsequently for the etherification, or other additives which cause homogenization of the mixture, e.g. methanol, are already present at this time. These are removed prior to etherification. The zinc salts, which are particularly suitable for carrying out the process, are preferably removed as hydrogen phosphates. The insoluble phosphates are advantageously prepared by metering in aqueous phosphoric acid at 20°–70° C., preferably 40°–60° C., in the course of about one hour. An excess of unreacted phosphoric acid should be avoided, since this may lead to an excessive increase in the molecular weight or to crosslinking of the mixture.

$a_{2.2}$ Another method which is also very effective involves the use of $Me^{++}$ formates or acetates or of other $Me^{++}$ salts which are present in solution under the conditions of the methylolation at 80°–100° C. but crystallize after cooling and can thus readily be separated off. Examples of suitable compounds for this purpose are zinc formate and barium acetate. The etherification is carried out under the conditions stated under $b_2$ below. Version $a_{2.2}$ can be particularly advantageously employed when process stage $a_1$ is carried out so that the product after this step has a mean molecular weight of 150–250.

$a_3$ In this process step, the water is separated off, i.e. the solvent water and the water of reaction. The latter is water eliminated during the etherification of the methylol groups with the alcoholic OH groups, and water from the formation of the methylene ether bridges. The degree of etherification of the methylol groups (with the alcoholic OH groups) can vary greatly but should be adjusted so that the reactivity of the products is not too high and ease of removal of residual phenol in the thin film evaporator is ensured. Otherwise, the degree of etherification depends on the intended use of the products. For example, for use as coating agents in cathodic electrocoating, products having a low methylol content are particularly advantageously employed in some cases. The preparation of such products is made possible by the novel process. The water is generally separated off in the presence of an entraining agent, such as toluene or cyclohexane, under reduced pressure, beginning at 30°–50° C., with the temperature slowly increasing to 60°–80° C. and the pH of the water which passes over decreasing. The transition to removal of the water of reaction formed during the etherification can be detected by virtue of the fact that the water distils off more slowly; this should be carried out at 45°–120° C., preferably 50°–110° C. When the etherification reactions are complete, the products generally have a degree of condensation of 2–6, preferably 3–5. The residual phenol content is 4–12, generally 5–7%, by weight, based on the solid resin. The temperatures for removing the water should be chosen so that, when the solvent water is removed in the lower temperature range of 30°–40° C., higher etherification temperatures of, for example, 60°–80° C. are employed; if the first step comprising water removal is carried out at, for example, 45°–50° C., lower temperatures, e.g. 50°–70° C. should be chosen for carrying out the etherification. Removal of the water present as solvent is preferably carried out at 35°–80° C., and the etherification reaction is preferably effected in two or three temperature stages, at 50°–85° C. Compounds which are suitable for the etherification are mono-, di- and tri-alcohols, preferably those which, under the conditions discussed below, are entrained from the reactor only to a small extent, if at all, e.g. ethylene glycol monobutyl ether, ethylene glycol monohexyl ether, phenyl glycol, diethylene glycol monobutyl ether, benzyl alcohol, ethylene glycol, hexane-1,6-diol, pentane-1,5-diol, butane-1,4-diol, mono-, di-, tri- and tetraethylene glycol, decane-1,10-diol, dipropylene glycol, thiodiglycol or mixtures of these alcohols. Dialcohols containing primary OH groups, such as hexane-1,6-diol, butane-1,4-diol, pentane-1,5-diol and mono-, di- and triethylene glycol, are particularly preferred. The etherification with the sparingly volatile dialcohols is carried out so that the conversion achieved is as complete as possible. In the extreme case, both OH groups of the alcohol are converted. In general, products are obtained whose alcohol components are etherified with methylol groups at one end and at both ends.

B. Where the process is carried out in a nonpolar organic solvent, the following applies:

$b_1$ The methylolation is effected in the presence of 0.1–0.3% by weight, based on the phenol employed, of $Me^{++}$ ions, selected from the divalent metals stated under $a_1$, preferably in the form of their carboxylates, in particular in the form of their naphthenates, octoates or neodecanoates.

$b_2$ The etherification is carried out in the presence of one or more monohydric, dihydric or trihydric alcohols, advantageously with recycling of the distillate at 95°–120° C. Particularly preferably, the methylolation and the condensation (etherification reactions) are carried out simultaneously. The statements made under $a_3$ apply to the alcohols to be used and to the products. In this part of the process (procedure in the presence of a little water, if any), removal of the catalyst is in general not envisaged. In the case of the products prepared by versions $a_{2.2}$ and $b_2$ of the process, the etherification is preferably carried out at 95°–115° C.

To reduce or remove the residual phenol, which also contains proportions of monomethylolphenol and of the alcohols, the products present after the etherification (process stage $a_3$ or $b_2$) are brought to a phenol content of <1% by weight in a thin film evaporator at 80°–120° C. and under reduced pressure.

For some applications, particularly in the coating sector, it is advantageous to provide products having a particularly low residual phenol content; in these cases, products containing from 0.05 to 0.5%, based on the solid resin, of phenol can readily be prepared according to the invention.

The degree of condensation generally increases again during this procedure. Removal of the residual phenols may also be effected in a plurality of stages, in thin film evaporators connected in series. The temperature and the residence time can be selected so that the products have the desired mean molecular weight. Mean molecular weights of 300–2,000, preferably 400–1,000, generally permit the products to be used for the intended purposes.

Viscous materials having a solids content of 85–97.5% are obtained, their color depending on the Me$^{++}$ compound used, and being, for example, pale when Zn$^{++}$ is employed and dark where Pb$^{++}$ is used.

Products prepared by version A., where the water of reaction has been removed at low temperatures (45°–80° C.) generally have a low etherification ratio of benzyl ether groups to methylolalkyl ether groups and a higher content of non-etherified methylol groups. Products for which the water of reaction has been removed at higher temperatures (80°–110° C.) possess a higher degree of etherification coupled with a low content of methylol groups and, in some cases, a higher content of methylene groups.

The novel products are used either in the stated highly concentrated form or diluted with some suitable solvent, e.g. an alcohol or an ester.

The phenol resol ethers prepared according to the invention can be used as the sole binder, or in combination with other substances suitable for co-crosslinking. Particular examples of these are binders containing basic N atoms in the molecule, particularly those which possess NH groups. Binders which are suitable for use as cathodic electrocoating binders, as described in, for example, German Patent Application No. P 34 22 474.2, O.Z. 0050/37173, may be mentioned in particular. The presence of an acidic catalyst, as mentioned for this purpose, may be useful for accelerating the crosslinking reaction.

The ortho-rich resol ethers prepared by the novel process are also useful as rubber modifiers.

Otherwise, the ortho-rich resol ethers are useful for the production of compression molding materials, laminates and adhesives and as binders or crosslinking agents for the production of electrical insulators. Moreover, the ortho-rich resol ethers can be converted to aqueous secondary dispersions which can also advantageously be used in some of the stated fields.

In the Examples, parts and percentages are by weight, unless stated otherwise.

EXAMPLE 1

1,075.0 parts of phenol, 1,886.0 parts of 40% strength aqueous formalin solution and 99.0 parts of zinc acetate (Zn(CH$_3$COO)$_2 \times$ 2H$_2$O) are slowly heated to 90° C. and kept at this temperature for 3.5 hours.

Thereafter, 500.0 parts of hexane-1,6-diol are added, and the mixture is cooled to 50° C. 44.5 parts of H$_3$PO$_4$ in 60.0 parts of water at this temperature are added dropwise in the course of one hour, the mixture is filtered through a folded filter, and the residue is washed with a little methanol.

The methanol is removed and 500.0 parts of toluene are added, after which water is separated off at about 45° C. and under 100–110 mbar in a reactor equipped with an efficient reflux condenser, until the separation process begins to slow down. Thereafter, the temperature of the mixture is increased stepwise to 50° C., 60° C. and 75° C., until the mean molecular weight has increased to about 300. The mixture is then filtered again, and treated at 115° C. and under 0.5 mbar in a thin film evaporator. The pale yellow resin (1,690.0 parts) has a solids content of 92%, a viscosity of 2,400 mPa.s at 75° C., measured using an ICI plate-and-cone viscometer, a mean molecular weight of 400, a phenol content of 0.35% and a zinc content of 90 ppm.

EXAMPLE 2

The mixture described in Example 1 is used. After the removal of the zinc phosphate, the water is separated off in the first step at 35° C. The subsequent temperature stages are 60° C., 75° C. and 80° C. The yield and properties of the resin are essentially the same as those of Example 1.

EXAMPLE 3

The mixture described in Example 1 is used. After the zinc phosphate has been removed, the water is separated off at 50° C. During the etherification, the temperature of this mixture is not allowed to exceed 65° C. The yield and the properties of the resin are essentially the same as those of Example 1.

EXAMPLE 4

11.6 parts of a solution of zinc naphthenate in toluene, containing 3% zinc, are added to 517.0 parts of phenol, 175.0 parts of toluene and 386.0 parts of technical-grade paraformaldehyde, and the mixture is heated to about 100° C. Thereafter, a further 11.6 parts of catalyst solution are added, and stirring is continued for 2 hours at 110° C. 36.0 parts of the aqueous distillate are removed, and recycled to the reactor. This procedure is repeated after a further 2 hours, with 75.0 parts of freshly separated off aqueous distillate. Thereafter, 160.0 parts of hexane-1,6-diol are added, and the mixture is then kept at 105°–110° C. The aqueous distillate separated off (70.0 parts) is recycled to the reactor in each case. During this period, the amount of water which can be separated off increases continuously and the content of formaldehyde decreases constantly, so that toward the end of the reaction, i.e. when a mean molecular weight of 400 is reached, an aqueous 40–45% strength formaldehyde solution passes over, and is separated off.

The mixture is then treated at 125° C. and under 0.5 mbar in a thin film evaporator. 773.0 parts of a pale brown resin are obtained. This product has a solids content of 95%, a viscosity of 2,400 mPa.s at 75° C., measured using an ICI plate-and-cone viscometer, a mean molecular weight of 450, a phenol content of 0.3% and a zinc content of 190 ppm.

EXAMPLE 5

1,075.0 parts of phenol, 1,886.0 parts of 40% strength formalin (40% strength aqueous formaldehyde solution), 36.7 parts of zinc oxide and 41.52 parts of formic acid are stirred for 6.5 hours at 90° C. When the mixture has been cooled, the organic phase is separated off from the aqueous phase and the resulting crystals, 300 parts of toluene and 400.0 parts of hexane-1,6-diol are added to the organic phase, and the latter is then substantially freed from water, beginning at 50° C. under reduced pressure and continuing to 80° C., and is then etherified under atmospheric pressure and at 105° C., with removal of the water formed, until the mean molecular weight reaches 400. The solution, which is clear after filtration, is freed from volatile components at 120° C. and under 0.5 mbar in a thin film evaporator.

1,380 parts of a pale brown resin are obtained. This product has a solids content of 94.5%, a viscosity of 1,760 mPa.s at 75° C., measured using an ICI plate-and-cone viscometer, a mean molecular weight of 520, a phenol content of 0.12% and a zinc content of 160 ppm.

EXAMPLE 6

Phenol and formalin are reacted as described in Example 5. The mixture is slowly cooled to about 20° C., 305 parts of butane-1,4-diol are added and the mixture is left to stand overnight at 23° C. Thereafter, 21.0 parts of orthophosphoric acid, dissolved in 31.0 parts of water, are added dropwise in the course of 40 minutes, and the crystals formed are separated off by filtration. 500 parts of toluene are added, after which about 1,100 parts of water are separated off under reduced pressure at 35°–40° C. The internal temperature is slowly increased to 50° C. until virtually no more water passes over. The etherification is then continued at 110° C. until the mean molecular weight reaches about 450.

The solution, which is clear after filtration, is freed from the volatile components at 125° C. and under 0.5 mbar in a thin film evaporator to give 1,280 parts of a pale yellow resin which has a solids content of 96.5%, a viscosity of 1,680 mPa.s at 75° C., measured using an ICI plate-and-cone viscometer, a mean molecular weight of 594, a phenol content of 0.1% and a zinc content of 200 ppm.

We claim:

1. A process for the preparation of an essentially phenol-free phenol resol ether, which is bonded via o,o′-methylene ether groups, from phenol or m-alkyl-substituted phenol or a mixture of phenol and m-alkyl-substituted phenols, or a mixture of phenol and m-alkylated phenol and other alkylphenols, and formaldehyde or a formaldehyde donor in the presence of $Me^{++}$ ions, and subsequent etherification with a monohydric, dihydric or trihydric alcohol, wherein
    A. where the process is carried out beginning with methylolation in an aqueous medium:
        $a_1$ the methylolation is carried out in the presence of 0.5–10% by weight, based on the phenol used, of $Me^{++}$ ions,
        $a_2$ the $Me^{++}$ ions are then removed as a sparingly soluble salt, and
        $a_3$ the water present as a solvent in the reaction mixture is removed at 30°–80° C. in the presence or absence of one or more monohydric, dihydric or trihydric alcohols and an entraining agent, and the water of reaction formed during the etherification is separated off at 45°–120° C., the water present as a solvent and the reaction water formed during the etherification being removed stepwise;
    B. where the process is carried out beginning with methylolation in a nonpolar organic solvent:
        $b_1$ the methylolation is carried out in the presence of 0.1–0.3% by weight, based on the phenol used, of $Me^{++}$ ions, and
        $b_2$ the etherification is effected at 95°–120° C. in the presence of one or more monohydric, dihydric or trihydric alcohols, with or without recycling of the distillate which passes over; and finally, the residual amounts of phenol in the products prepared according to A. or B. are removed by evaporation in a thin film evaporator until the phenol content is less than 1% by weight.

2. The process of claim 1, wherein a monohydric or dihydric alcohol is used for the etherification.

3. The process of claim 1, wherein the alcohol used is a dialcohol.

4. The process of claim 1, wherein the $Me^{++}$ ions are used in the form of a carboxylate.

5. The process of claim 1, wherein, when the process is carried out according to A, the carboxylate used is a formate, acetate or propionate of a divalent metal.

6. The process of claim 1, wherein, when the process is carried out according to B, a naphthenate, octoate or neodecanoate of a divalent metal is employed.

7. The process of claim 1, wherein, when the process is carried out according to A, the divalent metal ions are separated off as salts of phosphoric acid.

* * * * *